(12) United States Patent
Koepf et al.

(10) Patent No.: US 10,483,072 B2
(45) Date of Patent: Nov. 19, 2019

(54) INTERRUPTER DEVICE FOR INTERRUPTING A DIRECT CURRENT

(71) Applicant: ELLENBERGER & POENSGEN GMBH, Altdorf (DE)

(72) Inventors: Hendrik-Christian Koepf, Braunschweig (DE); Ernst-Dieter Wilkening, Braunschweig (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 0 days.

(21) Appl. No.: 15/864,417

(22) Filed: Jan. 8, 2018

(65) Prior Publication Data

US 2018/0122612 A1    May 3, 2018

Related U.S. Application Data

(63) Continuation of application No. PCT/EP2016/063156, filed on Jun. 9, 2016.

(30) Foreign Application Priority Data

Jul. 8, 2015  (DE) .................. 10 2015 212 802

(51) Int. Cl.
*H01H 89/00* (2006.01)
*H01H 9/54* (2006.01)
*H02H 7/122* (2006.01)

(52) U.S. Cl.
CPC .............. *H01H 89/00* (2013.01); *H01H 9/54* (2013.01); *H02H 7/1222* (2013.01)

(58) Field of Classification Search
CPC ........ H01H 9/54; H01H 9/542; H01H 9/0271; H01H 9/50; H01H 2009/546;

(Continued)

(56) References Cited

U.S. PATENT DOCUMENTS 4,816,958 A * 3/1989 Belbel .................. H01H 33/161
                                                       361/11
4,920,448 A   4/1990 Bonhomme
(Continued)

FOREIGN PATENT DOCUMENTS

DE    103 15 982 A1    11/2003
DE    102 25 259 B3    1/2004
(Continued)

OTHER PUBLICATIONS

Machine translation of Yamauchi et al. Japanese Patent Document JP 2015-050080 A Mar. 16, 2015 (Year: 2015).*

*Primary Examiner* — Kevin J Comber
(74) *Attorney, Agent, or Firm* — Muncy, Geissler, Olds & Lowe, P.C.

(57) ABSTRACT

An interrupter device for interrupting a direct current between a direct current source and an electrical device, for example, between a photovoltaic generator and an inverter. The interrupter device has a mechanical switch which has a first fixed contact, a second fixed contact, and a contact bridge that can be moved between a first position and a second position. The contact bridge and the first fixed contact are electrically contacted to a semiconductor switch which blocks a current when the contact bridge is in the first position. A control input of the semiconductor switch is connected to the mechanical switch such that an arc voltage generated as a result of an arc across the switch connects the semiconductor switch so as to conduct a current when the contact bridge is moved into the second position.

17 Claims, 2 Drawing Sheets

(58) Field of Classification Search
CPC ........ H01H 33/596; H01H 89/00; H01H 1/20;
H02H 7/1222; H02S 40/32; H02S 40/34
USPC ...................................................... 361/91.2
See application file for complete search history.

(56) References Cited

U.S. PATENT DOCUMENTS

| | | |
|---|---|---|
| 8,742,828 B2 | 6/2014 | Naumann et al. |
| 2003/0193770 A1 | 10/2003 | Chung |
| 2012/0007657 A1 | 1/2012 | Naumann et al. |

FOREIGN PATENT DOCUMENTS

| | | |
|---|---|---|
| DE | 20 2008 010 312 U1 | 11/2008 |
| DE | 20 2009 004 198 U1 | 8/2010 |
| DE | 20 2012 103 067 U1 | 10/2012 |
| JP | 2015-050080 A | 3/2015 |
| WO | WO 2010/108565 A1 | 9/2010 |
| WO | WO 2011/018113 A1 | 2/2011 |

\* cited by examiner

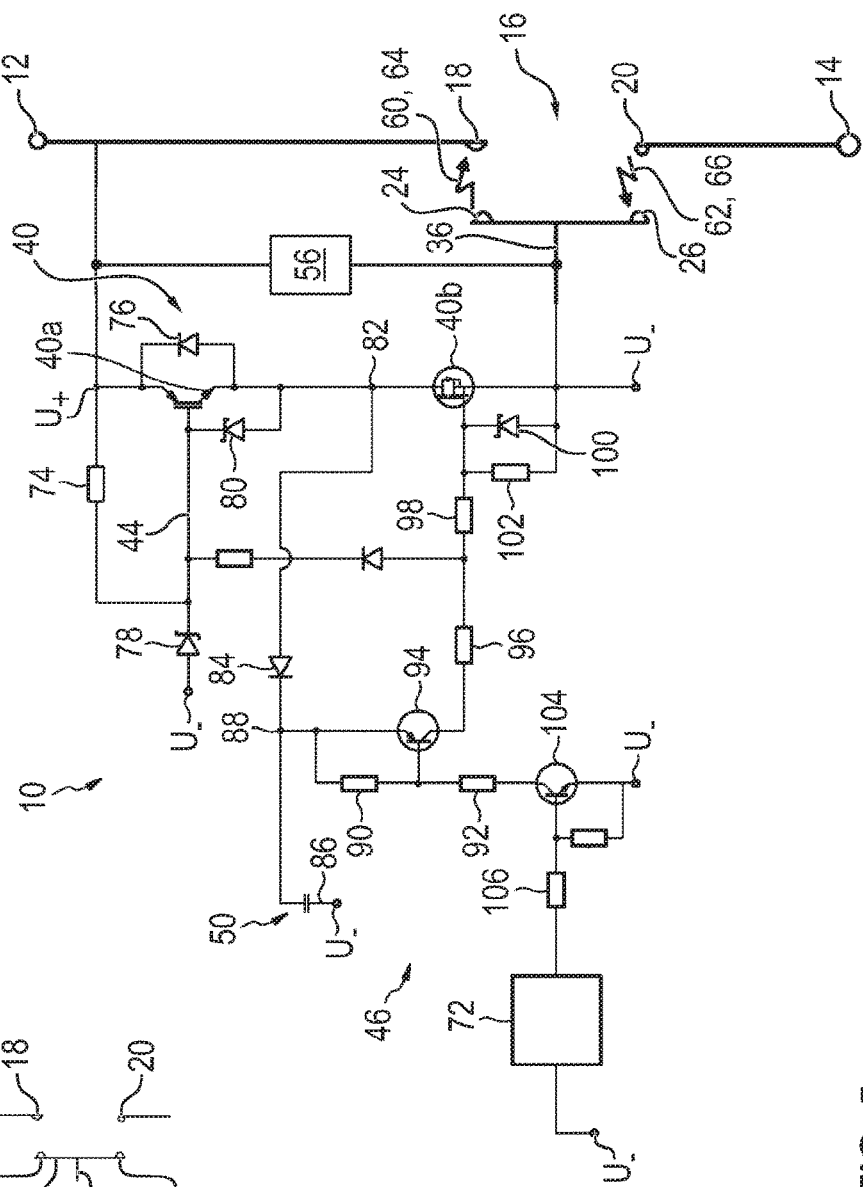
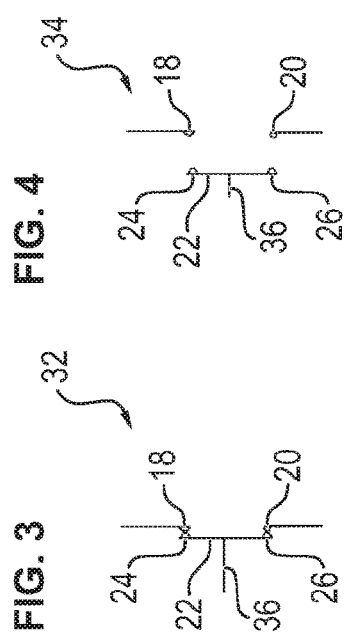
FIG. 3
FIG. 4
FIG. 5

INTERRUPTER DEVICE FOR INTERRUPTING A DIRECT CURRENT

This nonprovisional application is a continuation of International Application No. PCT/EP2016/063156, which was filed on Jun. 9, 2016, and which claims priority to German Patent Application No. 10 2015 212 802.4, which was filed in Germany on Jul. 8, 2015, and which are both herein incorporated by reference.

BACKGROUND OF THE INVENTION

Field of the Invention

The present invention relates to an interrupter device for interrupting a direct current between a direct current source and an electrical device, having a current-conducting mechanical switch and a semiconductor switch connected thereto. In this case, a DC source can be understood, for example, to be a photovoltaic generator (PV generator, solar installation) and an electrical device to be in particular an inverter.

Description of the Background Art

DE 20 2008 010 312 U1 describes a photovoltaic installation (PV installation) or solar installation having a so-called photovoltaic generator, which for its part includes solar panels combined in groups to form partial generators which are in turn connected in series or are present in parallel rows, wherein the DC power of the photovoltaic generator is fed via an inverter into an AC voltage network. Because depending on the system, on the one hand, a PV installation permanently delivers an operating current and an operating voltage in the range between 180 V (DC) and 1500 V (DC) and, on the other hand, a reliable separation is desired of the electrical components or devices from the photovoltaic installation, acting as a DC source, for example, for the purpose of installation, mounting, or servicing and in particular also for general personal protection, a suitable interrupter device must be able to effect an interruption under load, i.e., without any prior switching off of the DC source.

For load disconnection, a mechanical switch (switching contact) can be used which has the advantage that a galvanic isolation of the electrical device (inverter) from the DC source (photovoltaic system) is effected when the contact is opened. If, in contrast, powerful semiconductor switches are used for load disconnection, unavoidable power losses at the semiconductors occur during normal operation as well. In addition, no galvanic isolation and hence no reliable personal protection are ensured with such power semiconductors.

DE 102 25 259 B3 describes an electrical plug-in connector which is designed as a load disconnector and, in the manner of a hybrid switch, has a semiconductor switch element in the form of, for example, a thyristor in the housing of the inverter and main and auxiliary contacts, which are connected to photovoltaic panels. The main contact leading in an unplugging process is connected in parallel to the lagging auxiliary contact connected in series to the semiconductor switch element. In this case, the semiconductor switch element is controlled to prevent an arc or to extinguish an arc by being periodically switched on and off.

For DC interruption, a hybrid electromagnetic DC switch with an electromagnetically actuated main contact and with an IGBT (insulated gate bipolar transistor) may also be provided as the semiconductor switch (DE 103 15 982 A2). However, a hybrid switch of this type has an external power source for operating power electronics with a semiconductor switch.

WO 2010/108565 A1, which corresponds to U.S. Pat. No. 8,742,828, which is incorporated herein by reference, discloses a hybrid disconnector switch with a mechanical switch or separating element and a semiconductor electronics connected in parallel therewith, which essentially comprises at least one semiconductor switch, for example, an IGBT. The semiconductor electronics has no additional energy source and blocks a current when the mechanical switch is closed, i.e., practically without current and voltage. The semiconductor electronics obtains the power required for its operation from the interrupter device, i.e., from the disconnector switch system itself, for which purpose the energy of the arc arising when the mechanical switch is opened is used. In this case, the semiconductor electronics on the control side is connected to the mechanical switch in such a way that, when the switch is opened, the arc voltage switches the semiconductor electronics via its switching contacts as a result of the arc.

As soon as the semiconductor electronics is switched in a current-conducting manner, the arc current begins to commutate from the mechanical switch to the semiconductor electronics. The corresponding arc voltage or the arc current in this case charges an energy storage in the form of a capacitor, which discharges with the generation of a control voltage specifically for the arc-free shutdown of the semiconductor electronics. The preset duration or time constant and thus the charging time of the energy storage or capacitor determine the arc duration. Following the charging process, a timer starts, during which the semiconductor electronics is controlled in an arc-free, current-blocking manner. The duration of the timer in this case is set for a safe extinguishing.

SUMMARY OF THE INVENTION

It is therefore an object of the present invention to provide a particularly suitable interrupter device (hybrid switch or hybrid electronics) for interrupting a direct current between a DC source, in particular a photovoltaic generator, and an electrical device, in particular an inverter, with the highest possible switching capacity and in particular the highest possible control speed, i.e., much more rapid control of the power electronics of the interrupter device, wherein control is expediently simplified and wherein safety is preferably increased.

The interrupter device, which can also be called a hybrid switch below, is suitable and in particular is provided and set up for interrupting an electric current flow between a DC source and an electrical device. The interrupter device is preferably used for interrupting a DC current between a DC source and an electrical device. The DC source is in particular a photovoltaic generator, for example, with an operating voltage in the range between 180 V (DC) and 1500 V (DC), and/or the electrical device is an inverter, by means of which during operation a direct electric current is transformed into an alternating electric current, which is fed into a utility grid, for example. The interrupter device is expediently used for interrupting a direct electric current between the photovoltaic generator and the inverter. For example, the interrupter device is used for interrupting an alternating current.

The mechanical switch has a first fixed contact and a second fixed contact. Each of the two fixed contacts can be electrically contacted to a connection device, such as a terminal. In the assembled state, in this case, for example, the second fixed contact is electrically contacted to the DC source and the first fixed contact to the electrical device by means of the respective terminal. The first fixed contact can be electrically contacted to the DC source and the second fixed contact to the electrical device. In particular, the contacting takes place by means of a connection device of the interrupter device, which is suitably set up for this purpose. The connection device is provided in particular for receiving a power line, which has, for example, a cross section of 2.5 mm$^2$, 4 mm$^2$, or 6 mm$^2$.

The switch further has a contact bridge that can be moved between a first position and a second position, which bridge is made in particular of a low-resistance material, such as, for example, a metal. In the first position, the first fixed contact and the second fixed contact are electrically contacted by means of the contact bridge. The contact bridge in the first position expediently bears against both the first fixed contact and the second fixed contact. In other words, the contact bridge is in direct mechanical contact with the first fixed contact and the second fixed contact. When a current flows across the mechanical switch, consequently, the electric current flows between the first fixed contact and the second fixed contact across the contact bridge.

In the second position, the contact bridge is spaced apart from the first fixed contact and the second fixed contact. In other words, the contact bridge is spatially separated from the two fixed contacts. For this purpose, the contact bridge is, for example, moved transversely or rotated so that it is not in direct mechanical contact with the two fixed contacts. In particular, the first fixed contact and the second fixed contact are thus electrically isolated from one another. The contact bridge expediently comprises a first moving contact and a second moving contact, wherein in the first position, the first moving contact bears directly against the first fixed contact, and the second moving contact bears directly against the second fixed contact. In the second position, the first moving contact is spaced apart from the first fixed contact and the second fixed contact is spaced apart from the second moving contact. The moving contacts are made, for example, from a material which is relatively resistant to burn-up. In particular, the contact bridge is designed as a single piece.

Further, the interrupter device comprises a semiconductor switch, in particular a power semiconductor switch, which is electrically contacted to the first fixed contact and the contact bridge. In other words, the semiconductor switch is connected in parallel to the contact gap between the first fixed contact and the contact bridge. Consequently, this contact gap is bridged by means of the semiconductor switch. The semiconductor switch can be electrically contacted suitably to the second fixed contact only by means of the contact bridge, namely, when the contact bridge is brought into the first position. For example, the semiconductor switch is an IGBT or a MOSFET. For example, the semiconductor switch can be realized by a series circuit of an IGBT and a MOSFET.

When the contact bridge is in the first position, the semiconductor switch is not electrically conductive, therefore current-blocking. For this purpose, a control input of the semiconductor switch is suitably contacted. When a current flow across the switch and the contact bridge moves into the second position, an arc forms between the first fixed contact and the contact bridge and another arc between the second fixed contact and the contact bridge, so that even with movement of the contact bridge into the second position an electrical current continues to flow across the mechanical switch. This occurs in particular at relatively high electrical voltages.

The control input of the semiconductor switch is connected to the mechanical switch in such a way that, when the contact bridge moves into the second position, the semiconductor switch is switched in a current-conducting manner. An arc voltage, which is brought about as a result of the arc between the first fixed contact and the contact bridge, is used to carry out the switching operation of the semiconductor switch. If, due to the electrical voltage applied to the interrupter device, no arc is generated, the semiconductor switch as well is accordingly not switched in a current-conducting manner upon movement of the contact bridge from the first position to the second position.

Because of the movable contact bridge, when current is conducted by means of the interrupter device, therefore, if the contact bridge is in the first position, a relatively low-resistance contact is realized between the DC source and the electrical device, therefore in particular between the two fixed contacts, so that an electrical loss is relatively low. When the contact bridge has been moved to the second position, a current flow is conducted between the contact bridge and the first fixed contact by means of the semiconductor switch, so that an arc between the contact bridge and the first fixed contact collapses. In this case, the further arc formed between the second fixed contact and the contact bridge continues to exist. When the electric current, conducted by means of the semiconductor switch, is switched, consequently, this further arc collapses, so that an electric current flow between the second fixed contact and the first fixed contact is prevented. Consequently, a reliable galvanic isolation, therefore, a DC interruption, between the DC source and the electrical device is ensured by the interrupter device, wherein it is precluded that a current flow continues even with a switching of the interrupter device.

When the interrupter device is switched and the contact bridge is subsequently moved from the first position to the second position, an arc is first formed between the second fixed contact and the contact bridge and between the contact bridge and the first fixed contact, so that an electric current flow between the two fixed contacts, and thus across the interrupter device, continues even if the voltage applied hereby is increased. The electrical voltage applied between the two fixed contacts here includes the arc voltage applied between the first fixed contact and the contact bridge, and of the other arc voltage applied between the contact bridge and the second fixed contact.

As a result of the arc between the contact bridge and the first fixed contact, the semiconductor switch is electrically connected, so that the current flow between the first fixed contact and the contact bridge commutates to the semiconductor switch. The current flow between the contact bridge and the first fixed contact thus does not take place across the arc but across the semiconductor switch, which is why the arc between the first fixed contact and the contact bridge extinguishes. The electrical current, which consequently continues to flow between the first and second fixed contact and which is conducted by the semiconductor switch and the further arc formed between the contact bridge and the second fixed contact, is interrupted in a further step by switching the semiconductor switch so that the further arc extinguishes.

The mechanical switch is in particular a double interrupter. The mechanical switch can be electrically actuated and for this purpose expediently comprises an electrical coil.

The mechanical switch can be an electromagnetic contactor. The electromagnetic contactor can have a closer configuration with a double break. In this way, a contact bridge movable between a first and second position is provided relatively economically. Such mechanical switches are relatively inexpensive and available in different configurations, so that, on the one hand, the interrupter device can be produced relatively inexpensively and, on the other, can be adapted to a wide spectrum of requirements. In particular, in this case the electromechanical contactor is selected as a function of the electric current conducted by the interrupter device.

For example, the interrupter device comprises a semiconductor electronics, connected in parallel to the semiconductor switch. The semiconductor switch is controlled in particular by the semiconductor electronics, so that the switch switches so as to conduct current due to the arc voltage. In other words, the control input of the semiconductor switch is electrically contacted to the semiconductor electronics. The semiconductor electronics suitably comprises an energy storage, such as a capacitor. For example, the energy storage is contacted electrically directly to the first fixed contact and the contact bridge. The energy storage can be interconnected within the semiconductor electronics such that electrical energy is only introduced into it if there is an arc. In other words, the energy storage is connected in such a way that it charges as a result of the arc. This takes place within an arc duration, therefore, within the time that the arc persists.

Expediently, the control input of the semiconductor switch is electrically contacted to the energy storage, for example, directly or by means of a further electrical or electronic component. Consequently, due to the energy storage, if it is charged, an electrical voltage exists between the control input and a terminal of the semiconductor switch, which is why the semiconductor switch switches so as to conduct current. Control of the semiconductor switch is simplified in this way. Consequently, only the contact bridge must be moved from the first position to the second position for the current-conducting switching of the semiconductor switch. For example, the control input of the semiconductor switch is routed by means of an ohmic resistor to the contact bridge or the first fixed contact, namely, the one of these two that has the higher electrical potential, if the contact bridge is in the second position. In other words, the control input is routed to the first fixed contact, provided it has a higher electrical potential than the contact bridge, or else the control input is routed to the contact bridge, if this has a more positive, higher voltage potential than the first fixed contact.

Preferably, after a charging time of the energy storage has ended, therefore, the time after which the energy storage is completely charged to at least 90% or at least 80%, the flowing electric current due to the switching of the semiconductor switch commutates completely to it, and in particular the semiconductor electronics. In other words, after the charging time of the energy storage has ended, the arc formed between the first fixed contact and the contact bridge collapses.

The semiconductor electronics can comprise a timer for arc-free disconnection of the semiconductor switch. In particular, the semiconductor switch is switched off after a turn-on period has ended, which can follow directly the charging time of the energy storage. The charging time is in particular the arc duration. The turn-on period is designed such that the electrical resistance of the semiconductor switch after switching has dropped to a relatively low value, which is at least lower than the arc voltage. It is ensured in this way that the arc has extinguished after the turn-on period has elapsed. In particular, the timer is set to a turn-on period of between 100 µs to 800 µs, or such that the charging time and the turn-on period together are between 100 µs and 800 µs, for example, between 200 µs and 600 µs and, for example, 500 µs. In this way, after the interrupter device is actuated, the direct current is safely interrupted after a relatively short period of time, so that safety is increased. For example, the timer is set by the energy storage and corresponds to the time required for a discharge of the energy storage by the current-conducting semiconductor switch.

The arc duration can be determined by the charging time or the charge capacity of the energy storage. In other words, the energy storage is selected and set such that the arc duration is changed as a function of the charging time or charge capacity. In this regard, the arc collapses when the energy storage is completely charged. By way of example, the energy storage is designed such that the arc duration lasts a maximum of between 100 µs and 800 µs, in particular between 200 µs and 600 µs. In this way, a thermal and electrical load of the contact bridge and the first fixed contact due to the arc is relatively low, which is why a relatively large number of switching operations can be performed by the interrupter device without a disruption affecting a function, therefore, a burn-up of the first fixed contact or the contact bridge.

An overvoltage protection is expediently connected in parallel to the semiconductor switch. In the case of ohmic-inductive loads, a stored inductive power is reduced by the overvoltage protection, so that after the interrupter device is switched, an applied voltage is reduced, which avoids destruction of the interrupter device or components connected thereto, such as the electrical device or the DC source. For example, the overvoltage protection comprises a varistor and is formed in particular thereof. In particular, a threshold voltage of the varistor is set to a maximum electrical voltage that can be applied to the semiconductor switch and/or the semiconductor electronics. In the case of an electrical voltage that would destroy the semiconductor switch or the semiconductor electronics, this will therefore be reduced by means of the varistor. In particular, the operation of the varistor is independent of a current flow direction.

In the second position, the second fixed contact and the contact bridge are expediently galvanically isolated from one another, at least if an electrical current flow across the interrupter device is interrupted. In particular, the second fixed contact under the contact bridge is not bridged by a further electrical or electronic component. In particular, the contact gap between the second fixed contact and the contact bridge is not electrically bridged or at least not electrically bridgeable. In other words, no further component is connected in parallel to the contact gap provided by the second fixed contact and the contact bridge, as is the case with the contact gap formed by the contact bridge and the first fixed contact. As a result, on the one hand, a galvanic isolation is provided by the interrupter device, namely, by the second fixed contact under the contact bridge, and further a safe interruption of an arc is realized, namely, due to the semiconductor switch by which the contact gap between the first fixed contact and the contact bridge is bridged. In addition, control of the interrupter device is simplified, because only the contact bridge must be moved for this from the first position to the second position. As a result, it is made possible to realize a control electronics of the interrupter device relatively simply and inexpensively, especially if it has the energy storage whose charging time or charge capacity is matched to the arc duration, and wherein when an energy storage is depleted, the semiconductor switch blocks current. Thus, upon moving the contact bridge from the first to the second position, the semiconductor switch first enters the electrically conductive state substantially independently and then again the electrical non-conductive state after the charging time and turn-on period corresponding to the time required for charging and discharging the energy storage.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows the contact bridge in a first position;

FIG. 4 shows the contact bridge in a second position; and

FIG. 5 is a circuit diagram of the interrupter device.

DETAILED DESCRIPTION

Figure 1:
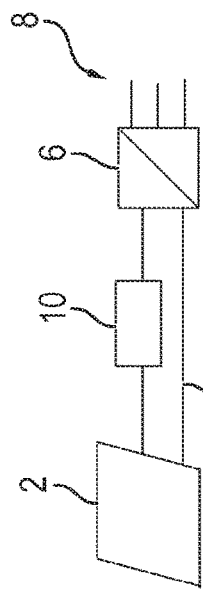
FIG. 1 schematically shows an interrupter device connected between a photovoltaic generator and an inverter.

FIG. 1 schematically shows a photovoltaic generator which functions as a DC source 2 and which comprises a number of individual photovoltaic panels with photovoltaic cells. During operation, an electrical DC voltage between 180 V (DC) and 1500 V (DC) is provided by the photovoltaic generator. Photovoltaic generator 2 is electrically contacted by means of a power line 4 to an electrical device configured as an inverter 6. As a result of the applied electrical voltage, a current flow conducted by power line 4 occurs between photovoltaic generator 2 and inverter 6. The supplied electric current, which is present due to photovoltaic generator 2 as direct current as a matter of principle and has a current strength of several amperes, is transformed by inverter 6 into an alternating current and fed, for example, into a three-phase utility grid 8. For this purpose, inverter 6 comprises a number of power semiconductor switches, which are electrically contacted to one another in a bridge circuit. An interrupter device 10 is incorporated into power line 4 for DC interruption, by means of which the flow of current between photovoltaic generator 2 and inverter 6 can be interrupted.

Figure 2:
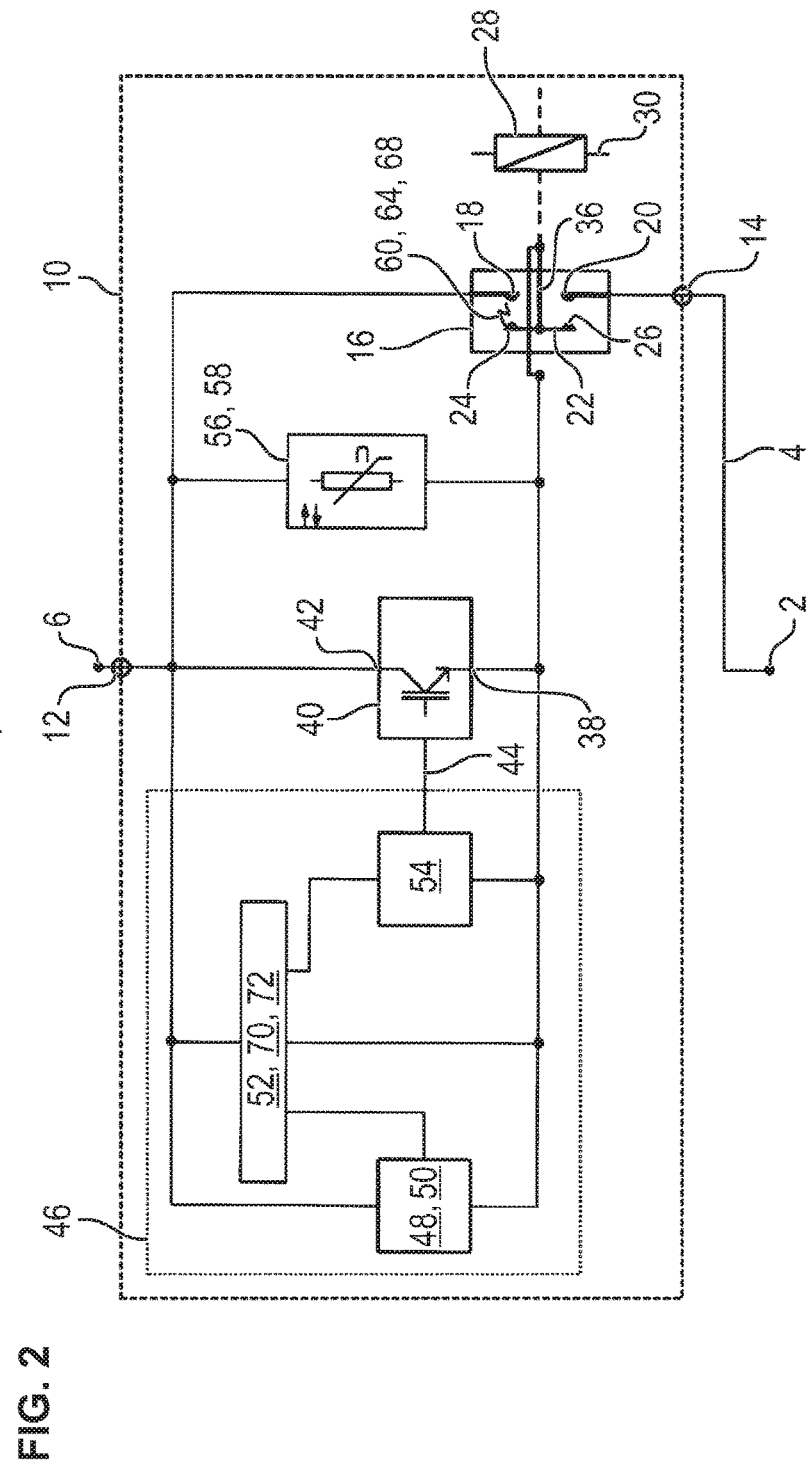
FIG. 2 is a block diagram of the interrupter device with a mechanical switch comprising a contact bridge.

Interrupter device 10, which is electrically contacted to inverter 6 and photovoltaic generator 2 by power line 4, is shown as a block diagram in FIG. 2. For this purpose, interrupter device 10 comprises a first connection device 12 and a second connection device 14, each in the form of a terminal. First connection device 12 is electrically contacted by means of a power cable or the like directly to inverter 6 and second connection device 14 by means of another power cable or the like to photovoltaic generator 2. The two power cables are firmly held on interrupter device 10 by the two connection devices 12, 14. Consequently, the two connection devices 12, 14 are used for both the electrical and the mechanical contacting.

Interrupter device 10 comprises a mechanical switch 16 in the form of an electromagnetic contactor in a closer configuration with a double break. Mechanical switch 16 has a first fixed contact 18, which is electrically contacted directly to first connection device 12. Furthermore, mechanical switch 16 comprises a second fixed contact 20, which is electrically contacted electrically directly to second connection device 14. Furthermore, mechanical switch 16 has a contact bridge 22 with a first moving contact 24 and a second moving contact 26. Contact bridge 22 is mechanically connected to an electromagnetic drive 28, which is acted upon with a signal line 30. According to the signals transmitted by signal line 30, in particular the application of an electrical voltage, contact bridge 22 is brought either into a first position 32, shown in FIG. 3, or into a position 34, shown in FIG. 4.

In the first position 32, first moving contact 24 of one-piece contact bridge 22 bears mechanically directly against first fixed contact 18 and second moving contact 26 bears mechanically directly against second fixed contact 20. As a result, a low-resistance connection between first fixed contact 18 and second fixed contact 20 is created by contact bridge 22. In second position 34, contact bridge 22 is spaced apart from first fixed contact 18 and second fixed contact 20. In other words, an air gap is formed between first moving contact 24 and first fixed contact 18 and between second moving contact 26 and second fixed contact 20; the air gap is in particular greater than 2 mm, 3 mm, 4 mm, or 5 mm and is preferably less than 10 mm, 8 mm, or 6 mm. To bring contact bridge 22 from first position 32 to second position 34, it is moved transversely.

Contact bridge 22 further also has a contact point 36, which is electrically contacted to a first input 38 of a semiconductor switch 40. A second input 42 of the semiconductor switch is electrically contacted directly to first fixed contact 18 and first connection device 12. Contacted electrically directly is understood in particular to mean that those components have substantially the same electrical potential during operation. By applying an electrical potential to a control input 44 of semiconductor switch 40, a current flow between first input 38 and second input 42 across semiconductor switch 40 can be switched on and off.

Control input 44 is controlled by means of semiconductor electronics 46, which is connected in parallel to semiconductor switch 40, therefore which is consequently electrically contacted to contact point 36 and first fixed contact 18. Semiconductor electronics 46 has a power supply 48 with an energy storage 50 and a control/protection unit 52, which is supplied with electric power by power supply 48. Control/protection unit 52 is used to control an output driver stage 54, by means of which signals of control/protection unit 52 are transformed into a signal for controlling semiconductor switch 40. By means of this signal, control input 44 is applied to control semiconductor switch 40.

Interrupter device 10 further comprises an overvoltage protection 56, which comprises a varistor 58. Overvoltage protection 56 is connected in parallel to semiconductor electronics 46 and to semiconductor switch 40 and thus electrically contacted to contact point 36 of contact bridge 22 and first fixed contact 18 of mechanical switch 16.

During normal operation, contact bridge 22 is in first position 32, so that an electric current flow between first connection device 12 and second connection device 14 is made possible. In this case, switch 16 conducts current and semiconductor switch 40 blocks current. Thus, a current flow between photovoltaic generator 2 and inverter 6 is made possible, which is why the electrical energy converted by photovoltaic generator 2 can be fed into utility grid 8. If photovoltaic generator 2 is to be disconnected from utility grid 8, for example, due to maintenance or malfunction, interrupter device 10 is actuated. In this case, contact bridge 22 is moved from first position 32 to second position 34 by electromechanical drive 28. Due to the applied electrical voltage, an arc 60 is formed between first fixed contact 18 and first moving contact 24 and another arc 62 (FIG. 5) is formed between second fixed contact 20 and second moving contact 26.

As a result, despite the open switch contacts of mechanical switch 16, an electrical current continues to flow between the two connection devices 12, 14. Due to the two arcs 60, 62, however, the electrical voltage present between the two connection devices 12, 14 is increased in comparison with a direct contact of moving contacts 24, 26 with the respectively associated fixed contacts 18, 20. The electrical voltage is composed of an arc voltage 64, produced due to arc 60, and of a further arc voltage, produced due to the further arc 62. Arc voltage 64 is applied further to semiconductor electronics 46. As a result, energy storage 50 is charged. Control/protection unit 52 and output driver stage 54 is powered by energy storage 50, and control input 44 of semiconductor switch 40 is supplied with an electrical potential. As a result, semiconductor switch 40 is switched so as to conduct current, so that an electric current flow between its two inputs 42, 38 is made possible.

The electrical resistance prevalent between the two inputs 38, 42 is thus lower than the electrical voltage of arc 64, for which reason it is extinguished; this takes place after a period of time directly following in time the movement of contact bridge 22 to second position 34. This period of time is also referred to as the arc duration 68, therefore, the duration for which arc 64 persists. Consequently, the current flow between contact point 36 and first connection device 12 is commutated to semiconductor switch 40 and there is no electrical current flow between first fixed contact 18 and first moving contact 24. The further arc 62 continues to exist, so that even after arc duration 68, a current flow continues between the two connection devices 12, 14. Arc duration 68 here is substantially 500 µs. After a turn-on period 70, which follows and is realized by a timer 72 of control/protection unit 52, semiconductor switch 40 is switched so as to be electrically blocking, and therefore a current flow between the two inputs 38, 42 is prevented, which occurs with the application of a suitable electrical potential to control input 44 by means of semiconductor electronics 46. As a result, further arc 62 is extinguished and second fixed contact 20 and contact bridge 22 are galvanically isolated. Consequently, photovoltaic generator 2 and inverter 6 are galvanically isolated from one another. If inductive loads are electrically contacted to power line 4, an overvoltage, which would lead to the destruction of semiconductor switch 40, semiconductor electronics 46, or mechanical switch 16, is reduced by overvoltage protection 56.

FIG. 5 shows a relatively detailed circuit diagram of interrupter device 10, which is also referred to as a hybrid circuit breaker. Semiconductor switch 40 comprises a first semiconductor switch 40a and a second semiconductor switch 40b, which are connected in parallel to overvoltage protection 56. Semiconductor electronics 46 has energy storage 50 and timer 72. Semiconductor electronics 46 is connected to first connection device 12, for example via a resistor or a resistor string 74. The gate of an IGBT, for example, used as first semiconductor switch 40a, forms control input 44 of semiconductor switch 40. Said control input 44 is routed via semiconductor electronics 46 to first fixed contact 18.

First semiconductor switch (IGBT) 40a is connected in a cascode arrangement to second semiconductor switch 40b in the form of a MOSFET in series. The potential $U_+$ applied to first semiconductor switch 40a is always greater than the potential $U_-$ on the opposite switch side where second semiconductor switch (MOSFET) 40b is routed to contact point 36. The positive potential $U_+$ is 0 V when mechanical switch 16 is closed; therefore, contact bridge 22 is in first position 32.

First semiconductor switch (IGBT) 40a is connected to a freewheeling diode 76. A first Zener diode 78 is connected on the anode side to the potential $U_-$ and on the cathode side to the gate (control input 44) of first semiconductor switch (IGBT) 40a. A second Zener diode 80 is in turn connected to the gate (control input 44) on the cathode side and to the emitter of first semiconductor switch (IGBT) 40a on the anode side.

A diode 84 is routed on the anode side to a center or cascode tap 82 between first and second semiconductor switches 40a and 40b of the cascode arrangement, said diode being connected to the potential $U_-$ on the cathode side via a capacitor 86, serving as energy storage 50. A plurality of capacitors 86 may also form energy storage 50. Via an anode-side voltage tap 88 between diode 84 and energy storage 50 or capacitor 86, a transistor 94 connected to ohmic resistors 90 and 92 is connected via further resistors 96 and 98 to the gate of second semiconductor switch (MOSFET) 40b. A further Zener diode 100 with a parallel resistor 102 is connected to the gate on the cathode side and to the source of second semiconductor switch (MOSFET) 40b on the anode side.

On the base side, transistor 94 is controlled via a transistor 104, which for its part is connected on the base side via an ohmic resistor 106 to the timer 72 designed, for example, as a monoflop. On the base-emitter side, transistor 104 is additionally connected to a further resistor 108.

When mechanical switch 16 is closed, the electrical contact between fixed contacts 18, 20 has a low impedance, whereas semiconductor switch 40 formed by first and second semiconductor switches 40a, 40b is high-impedance and thus current-blocking. Before the opening of mechanical switch 16, the electrical voltage arising there is virtually 0 V and increases abruptly with the opening of contact bridge 22 of mechanical switch 72 to a value characteristic for arcs 60, 62 with the typical arc voltage 64, 66, for example, 20 V to 30V. The positive potential $U_+$ thus tends toward this arc voltage $64 \approx 30$ V when mechanical switch 16 opens.

During the time period following the contact opening time (arc time interval), the commutation of the switch current, substantially corresponding to the arc current, from arc 60 to semiconductor switch 40 already begins. During the arc time interval, the arc current in effect divides between semiconductor switch 40 and arc 60. Energy storage 50 is charged during this arc time interval. The time period is set such that, on the one hand, sufficient energy is available for a reliable control of semiconductor electronics 46, in particular for its shutdown during a time period following the arc time interval. On the other hand, the arc time interval is sufficiently short so that undesirable contact erosion or contact wear of switch 16 or its switch contacts 18, 20, 24, 26 is avoided.

With the start of arc 60 and thus with the formation of arc voltage 64, first semiconductor switch (IGBT) 40a is activated by resistor 74 at least so far that a sufficient charging voltage and a sufficient arc current or charging current are available for capacitors 86 and thus for energy storage 50. Preferably, for this purpose, a control loop of electronics 46 can be created with the corresponding circuit of first semiconductor switch (IGBT) 40a with resistor 74 and Zener diode 78, by which loop the voltage is set at cascode tap 82, for example, to $U_{Ab}$=12 V (DC). In this case, a fraction of the arc current flows through the first semiconductor switch (IGBT) 40a near the positive potential $U_+$.

The resulting tap voltage essentially serves to supply transistors 94 and 104 as well as timer 72 and energy storage 50 of electronics 46. Diode 84 connected on the anode side to cascode tap 82 and on the cathode side to capacitor 86 prevents a return of the charging current from capacitors 86 in the direction of the potential $U_-$. If sufficient energy is contained in capacitor 86 and thus in energy storage 50, and if, accordingly, a sufficiently high control or switching voltage is present at voltage tap 88, transistor 104 and consequently transistor 94 are activated, so that the two semiconductor switches 40a, 40b also activate completely. Due to the comparatively very high resistance of the gap section of mechanical switch 16, said section formed between first fixed contact 18 and first moving contact 24, the arc current flows almost exclusively across semiconductor switch 40, which has a much lower resistance due to the now activated semiconductor switches 40a, 40b.

The positive potential $U_+$ thus again tends toward 0 V when the switch current is commutated to semiconductor switch 40. As a result, arc 60 is extinguished between contacts 18, 24 of mechanical switch 16, whereas further arc 62 persists.

The charge capacity and thus the stored energy contained in capacitor 86 are calculated such that semiconductor switch 40 conducts the electric current for a time period predetermined by timer 72. This time period can be set to, for example, 500 μs. The calculation of this time period and thus the setting of timer 72 are substantially governed by the application-specific or typical time periods for a complete extinction of arc 60 and by a sufficient cooling of the plasma formed thereby. A decisive factor here is that no new arc 60, 62 can occur after electronics 46 is disconnected with thereupon current-blocking semiconductor switch 40 at the still open mechanical switch 16 or via its contacts 18, 20, 24, 26.

The invention is, of course, not limited to the exemplary embodiment described above. Rather, other variants of the invention can also be derived herefrom by the skilled artisan, without going beyond the subject of the invention. Particularly, further all individual features described in relation to the exemplary embodiments can also be combined with one another in a different manner, without going beyond the subject of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An interrupter device for interrupting a direct current between a direct current source and an electrical device, the interrupter device comprising:
   a semiconductor switch;
   a mechanical switch that has a first fixed contact, a second fixed contact, and a contact bridge that is adapted to be moved between a first position and a second position, wherein in the first position, the first fixed contact and the second fixed contact are electrically contacted via the contact bridge, and in the second position, the contact bridge is spaced apart from the first fixed contact and the second fixed contact and the second fixed contact is galvanically isolated from the contact bridge, wherein when the contact bridge is in the second position, the first fixed contact is galvanically isolated from the second fixed contact,
   wherein the contact bridge and the first fixed contact are electrically contacted to the semiconductor switch, which blocks a current when the contact bridge is in the first position, and
   wherein a control input of the semiconductor switch is connected to the mechanical switch such that an arc voltage generated as a result of an arc across the mechanical switch connects the semiconductor switch so as to conduct the current when the contact bridge is moved into the second position.

2. The interrupter device according to claim 1, wherein the mechanical switch is an electromechanical contactor in a closer configuration with a double break.

3. The interrupter device according to claim 1, wherein semiconductor electronics are connected in parallel to the semiconductor switch, which has an energy storage that charges as a result of the arc within an arc duration, and
   wherein the control input of the semiconductor switch is electrically contacted to the energy storage.

4. The interrupter device according to claim 3, wherein the semiconductor electronics includes a timer for an arc-fee disconnection of the semiconductor switch after a turn-on period has ended, which follows a charging time of the energy storage device.

5. The interrupter device according to claim 3, wherein the arc duration is determined by a charging time or charge capacity of the energy storage.

6. The interrupter device according to claim 5, wherein the arc duration is between 100 μs and 800 μs.

7. The interrupter device according to claim 1, further comprising an overvoltage protection connected in parallel to the semiconductor switch.

8. The interrupter device according to claim 7, wherein the overvoltage protection comprises a varistor.

9. The interrupter device according to claim 1, wherein the direct current between a photovoltaic generator and an inverter is interrupted.

10. The interrupter device according to claim 1, wherein an overvoltage protection is electrically contacted to the contact bridge and the direct current source.

11. The interrupter device according to claim 10, wherein a threshold voltage of the overvoltage protection is set to a maximum electrical voltage that can be applied to the semiconductor switch.

12. The interrupter device according to claim 1, wherein the mechanical switch comprises an electrical coil.

13. The interrupter device according to claim 1, wherein semiconductor electronics are connected in parallel to the semiconductor switch.

14. The interrupter device according to claim 1, further comprising an energy storage that charges as a result of the arc within an arc duration.

15. The interrupter device according to claim 14, wherein the control input of the semiconductor switch is electrically contacted to the energy storage.

16. An interrupter device for interrupting a direct current between a direct current source and an electrical device, the interrupter device comprising: a semiconductor switch; a mechanical switch that has a first fixed contact, a second fixed contact, and a contact bridge that is adapted to be moved between a first position and a second position, wherein in the first position, the first fixed contact and the second fixed contact are electrically contacted via the contact bridge, and in the second position, the contact bridge is spaced apart from the first fixed contact and the second fixed contact and the second fixed contact is galvanically isolated from the contact bridge, wherein the contact bridge and the first fixed contact are electrically contacted to the semiconductor switch, which blocks a current when the contact bridge is in the first position, and wherein a control input of the semiconductor switch is connected to the mechanical switch such that an arc voltage generated as a result of an arc across the mechanical switch connects the semiconductor switch so as to conduct the current when the contact bridge is moved into the second position, wherein the contact bridge comprises a contact point directly electrically contacted to a first input of the semiconductor switch.

17. A system comprising:
a direct current source;
an electrical device; and
an interrupter device for interrupting a direct current between the direct current source and the electrical device, the interrupter device comprising:
a semiconductor switch;
a mechanical switch having a first fixed contact, a second fixed contact and a contact bridge, the mechanical switch being configured to move between a first position and a second position,
wherein, in the second position, the contact bridge is spaced apart from the second fixed contact and the second fixed contact is galvanically isolated from the contact bridge, wherein, when the contact bridge is in the second position, the first fixed contact is galvanically isolated from the second fixed contact, wherein the semiconductor switch blocks a current when the contact bridge is in the first position, and wherein the mechanical switch connects the semiconductor switch to conduct the current when the contact bridge is moved into the second position.

* * * * *